(12) United States Patent
Klingauf et al.

(10) Patent No.: US 10,124,761 B2
(45) Date of Patent: Nov. 13, 2018

(54) TENSIONER DRIVE FOR A SAFETY BELT SYSTEM

(71) Applicant: TAKATA AG, Aschaffenburg (DE)

(72) Inventors: Gerhard Klingauf, Balzheitm (DE); Christine-Martina Ganso, Erbach (DE); Daniel Windmiller, Ulm (DE); Sascha Sotlar, Kuchen (DE)

(73) Assignee: Joyson Safety Systems Germany GmbH, Aschaffenburg (DE)

( * ) Notice: Subject to any disclaimer, the term of this patent is extended or adjusted under 35 U.S.C. 154(b) by 247 days.

(21) Appl. No.: 15/093,405

(22) Filed: Apr. 7, 2016

(65) Prior Publication Data

US 2016/0339868 A1    Nov. 24, 2016

(30) Foreign Application Priority Data

May 20, 2015 (DE) .......................... 10 2015 209 252

(51) Int. Cl.
*B60R 22/46* (2006.01)

(52) U.S. Cl.
CPC .. *B60R 22/4633* (2013.01); *B60R 2022/4642* (2013.01)

(58) Field of Classification Search
CPC ............... B60R 22/46; B60R 22/4633; B60R 2022/4642
See application file for complete search history.

(56) References Cited

U.S. PATENT DOCUMENTS

| 6,363,722 B1 * | 4/2002 | Takehara | B60R 22/4628 60/632 |
| 8,641,097 B2 * | 2/2014 | Hodatsu | B60R 22/4628 280/806 |
| 2012/0032016 A1 | 2/2012 | Tomita et al. | |

FOREIGN PATENT DOCUMENTS

| DE | 11 2005 002 942 T5 | 10/2007 |
| WO | WO 2006/056517 A1 | 6/2006 |
| WO | WO 2012/073430 A1 | 6/2012 |

* cited by examiner

*Primary Examiner* — Sang K Kim
(74) *Attorney, Agent, or Firm* — Gordon Rees Scully Mansukhani, LLP

(57) ABSTRACT

Tensioner drive for a safety belt device that includes a gas generator, a driving wheel, and a feed tube. The tube connects the gas generator and the driving wheel. There is at least one thrust body in the feed tube. The thrust body is accelerated after triggering of the gas generator and drives the driving wheel. There is a fixing element between the thrust body and the gas generator that is supported on the inner wall of the feed tube.

19 Claims, 7 Drawing Sheets

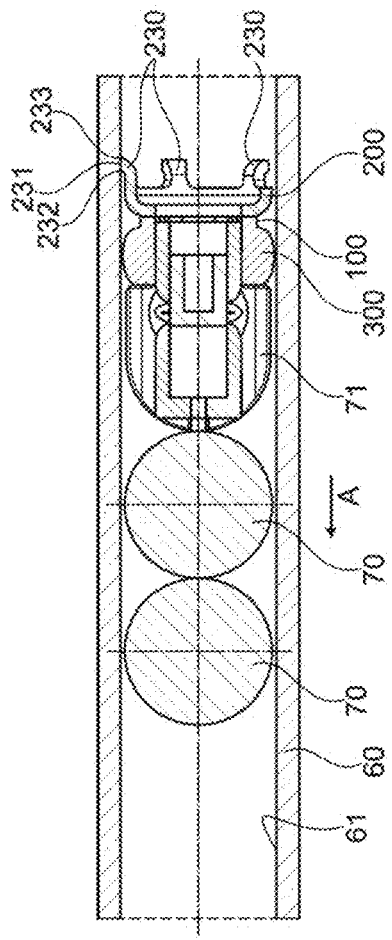
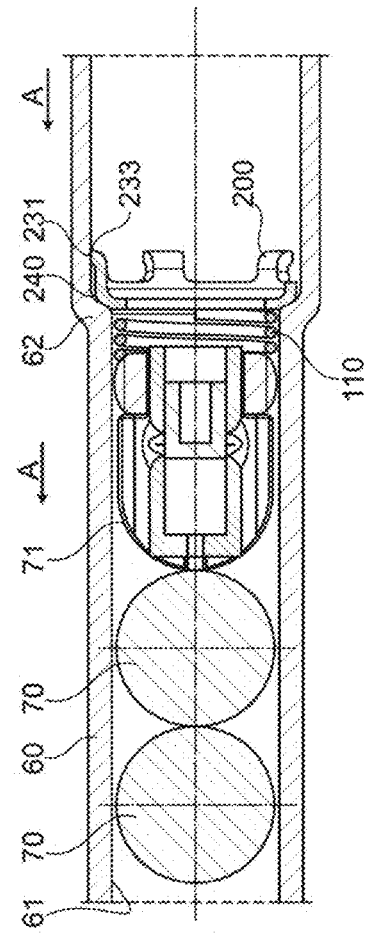
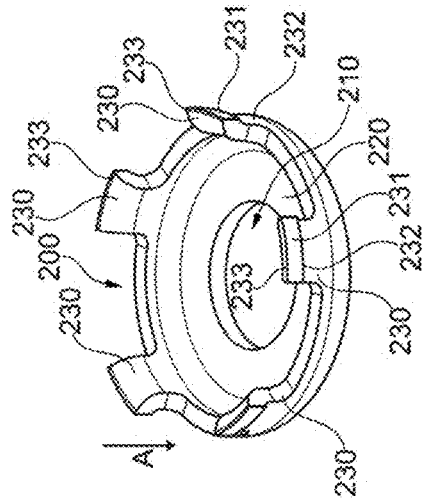
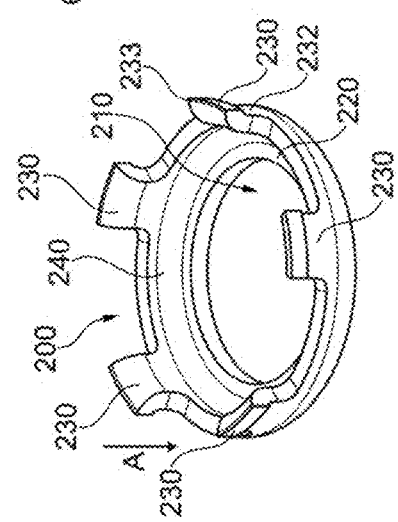

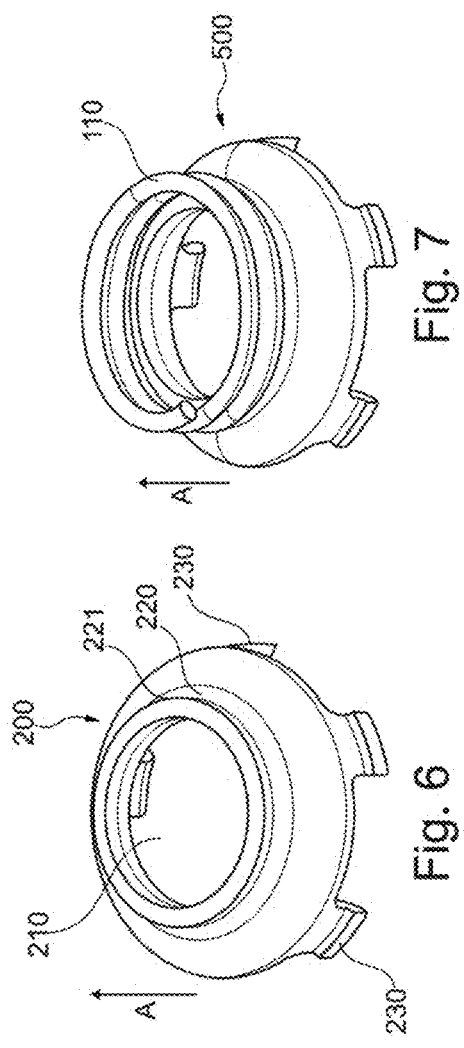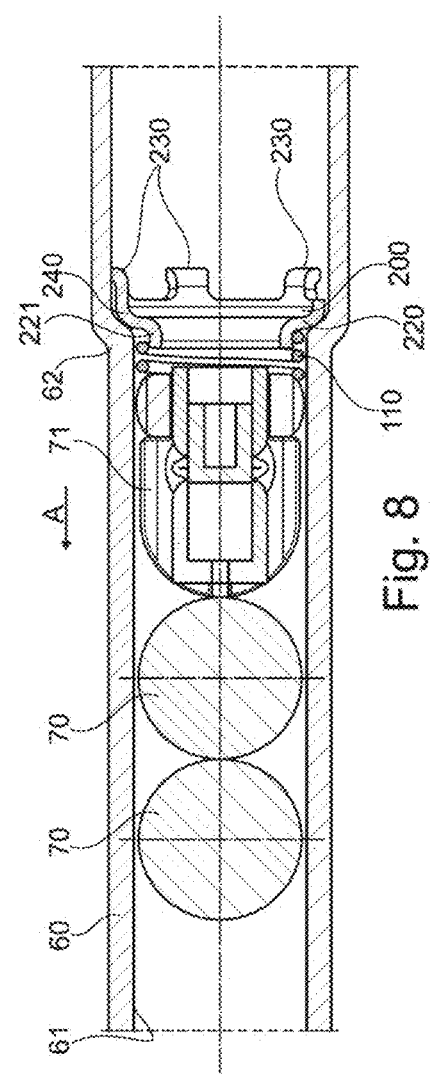

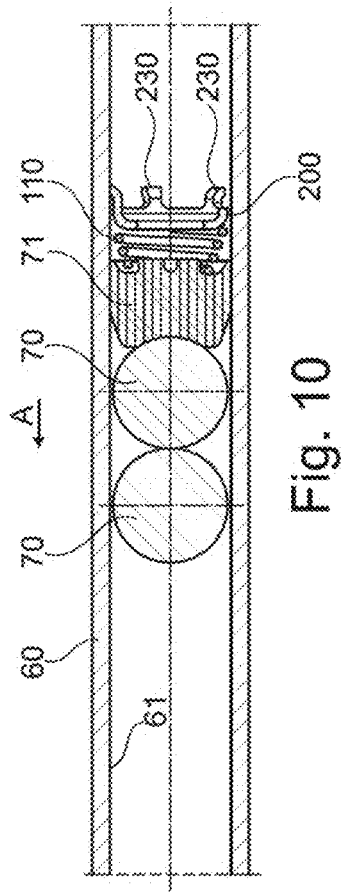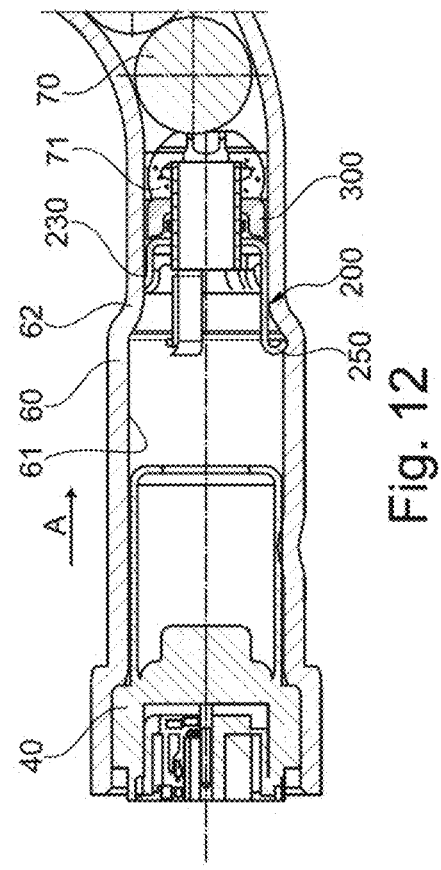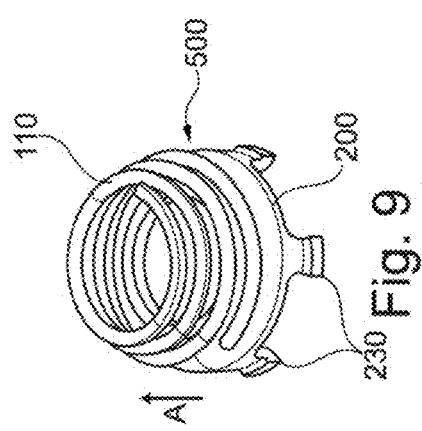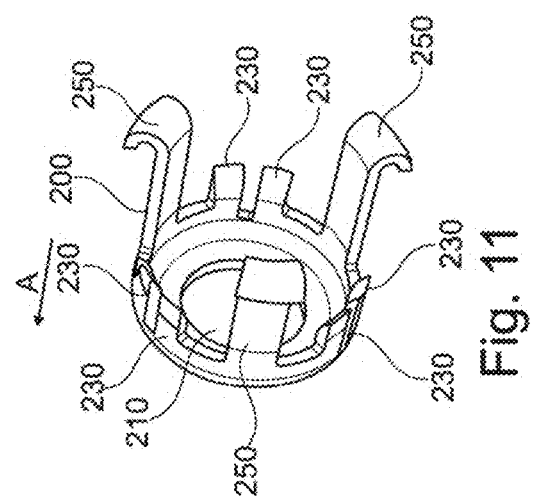

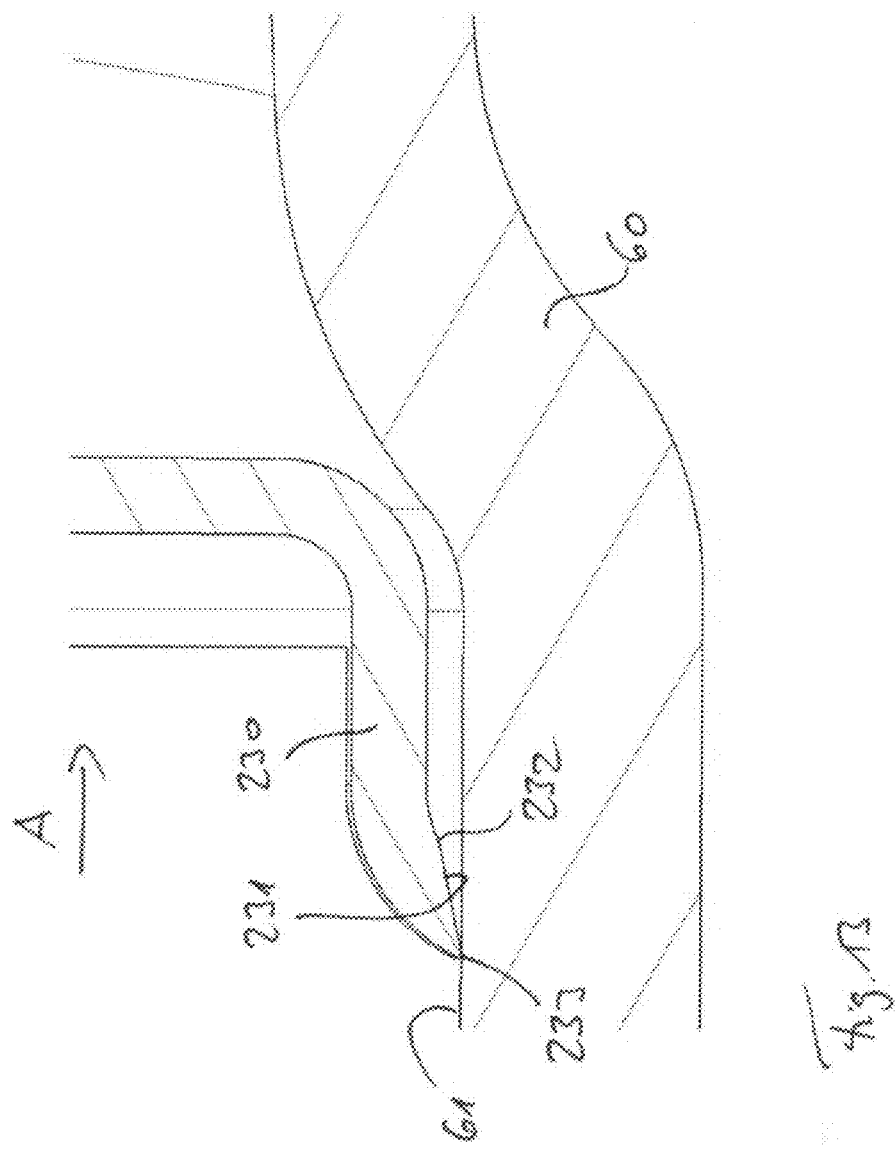

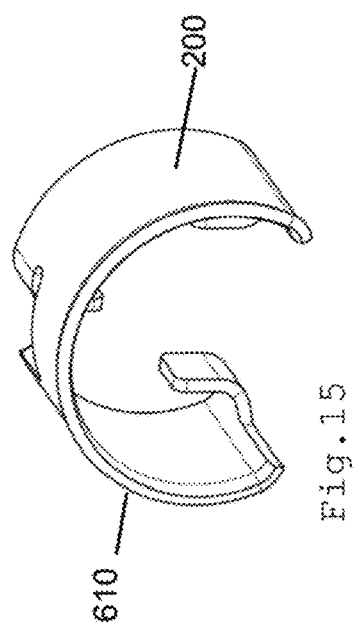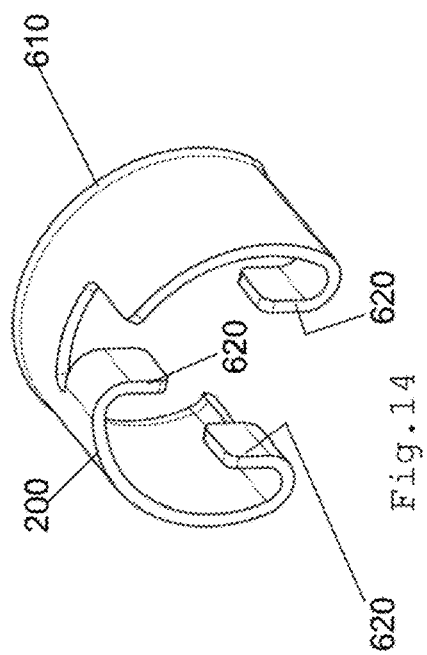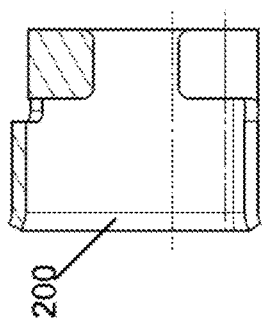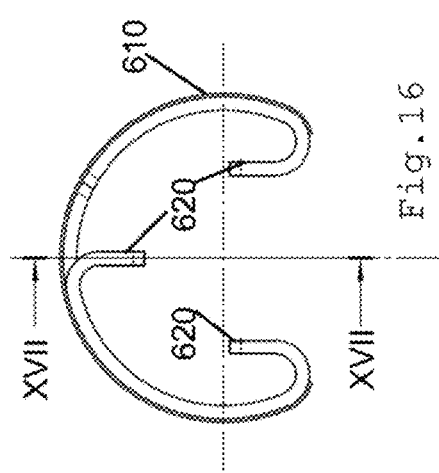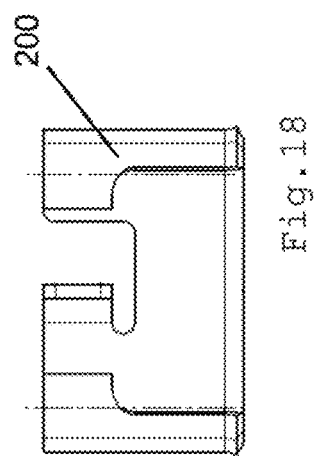

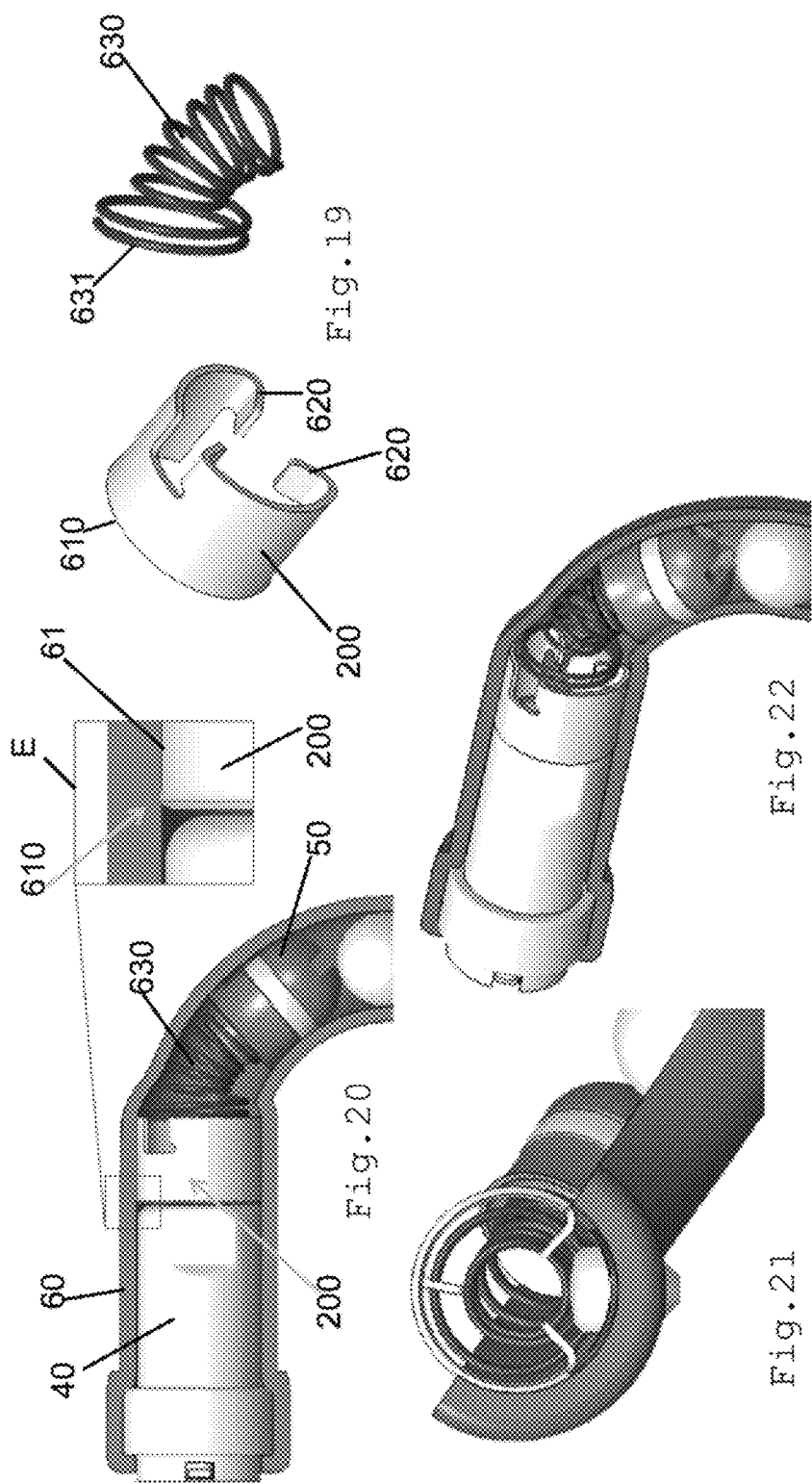

TENSIONER DRIVE FOR A SAFETY BELT SYSTEM

The priority application, German Patent Application No. 10 2015 209 252.6, filed May 20, 2015, is incorporated by reference herein in its entirety.

The invention relates to a tensioner drive for a safety belt device having at least one thrust body.

A tensioner drive of this kind for a safety belt device is known from US Published Patent Application US 2012/0032016 A1. The previously known tensioner drive has a gas generator, a driving wheel and a feed tube, which connects the gas generator and the driving wheel. In the feed tube—in the region between the gas generator and the driving wheel—there is a plurality of thrust bodies, namely spherical thrust bodies and a thrust body in the form of a driving piston. In order to hold the thrust bodies and the driving piston without rattling in the feed tube before the triggering of the gas generator, a helical spring is arranged between the gas generator and the first thrust body (i.e. the driving piston), said spring being able to prevent a rattling movement of the thrust bodies and of the driving piston within the feed tube.

It is the underlying object of the invention to further optimize a tensioner drive of the type stated at the outset in respect of tensioning behavior.

According to the invention, this object is achieved by a tensioner drive having the features according to patent claim 1. Advantageous embodiments of the tensioner drive according to the invention are given in the dependent claims.

Accordingly, provision is made according to the invention for there to be a fixing element between the at least one thrust body and the gas generator, said fixing element being supported on the inner wall of the feed tube.

One significant advantage of the tensioner drive according to the invention is to be regarded as the fact that the thrust body and the gas generator are separated from one another by a self-supporting fixing element. A fixing element of this kind can be used, for example, to support a spring element separately from the gas generator and to ensure rattle-free support of the thrust body or bodies within the feed tube without involving the gas generator.

In the case of a plurality of thrust bodies, the fixing element is preferably arranged between the first thrust body—as seen from the direction of the gas generator—and the gas generator.

With a view to optimum operation of the gas generator, it is regarded as particularly advantageous if the fixing element and the gas generator are spaced apart or do not touch one another.

With a view to rattle-free support of the thrust body or bodies, it is regarded as advantageous if a spring element arranged between the fixing element and the thrust body is supported on the fixing element, in particular on an annular holding portion of the fixing element, the spring force of said spring element pushing the thrust body in the direction of the driving wheel and holding the thrust body without rattling within the feed tube before the triggering of the gas generator. It is a significant advantage of this embodiment that—in contrast to the helical spring in the US Published Patent Application US 2012/0032016 A1 mentioned at the outset—the spring element is not supported on the gas generator and thus cannot affect or impair the operation thereof, but is supported on the fixing element. In other words, the fixing element separates the spring element from the gas generator, with the result that the ignition behavior of the gas generator is fully independent of the operation of the spring element or of the presence of the spring element. For example, the gas generator can burst without the bursting process being impaired by the spring element.

As regards the fixing of the fixing element within the feed tube, it is regarded as particularly advantageous if—as seen in the longitudinal direction of the feed tube—frictional or positive engagement is used to ensure that, after the triggering of the gas generator, the fixing element remains in the assembly position specified before the triggering of the gas generator (this refers to the position after completion of assembly or production of the tensioner drive) or at least lags behind the thrust body situated immediately in front and driven by the gas generator.

The fixing element preferably has at least one claw, which extends radially outward and rests resiliently against the inner wall of the feed tube, forming a nonpositive or frictional joint.

The claw can be circular-arc-shaped and can be formed by a radially outwardly curved edge of the fixing element. The circular-arc-shaped claw therefore preferably extends radially to the outside and can therefore rest resiliently against an inner wall of a feed tube, forming a nonpositive or frictional joint.

As an alternative or in addition, provision can be made for the fixing element to have at least one supporting portion, which is supported on a taper of the feed tube in the assembly position before the triggering of the gas generator or is pushed onto the taper after the triggering of the gas generator.

As an alternative or in addition, provision can also be made for the fixing element to have at least one hook, which, in the assembly position before the triggering of the gas generator, is hooked to a taper of the feed tube to form a positive joint with the feed tube or, after the triggering of the gas generator, is hooked to the taper to form a positive joint with the feed tube.

With a view to minimum production costs, it is regarded as particularly advantageous if the fixing element is formed by a bent sheet-metal part.

The sheet-metal part preferably rests resiliently against the inner wall of the feed tube by means of an end face of the sheet to form a nonpositive or frictional joint.

Provision can also be made for an end edge of an end face of the sheet to press resiliently against the inner wall of the feed tube to form a nonpositive or frictional joint.

It is particularly advantageous if the sheet-metal part has a claw portion, which forms a claw, and extends radially outward and rests resiliently against the inner wall of the feed tube to form a nonpositive or frictional joint.

As regards the last-mentioned claw configuration, it is regarded as particularly advantageous if the claw portion is formed by an end portion of the sheet of the sheet-metal part and an end face of the sheet in the region of the claw portion rests resiliently against the inner wall of the feed tube to form a nonpositive or frictional joint, and/or an end edge of the end face of the sheet in the region of the claw portion presses resiliently against the inner wall of the feed tube to form a nonpositive or frictional joint.

As an alternative or in addition, provision can be made for the sheet-metal part to have at least one supporting portion, which is supported on a taper of the feed tube in the assembly position before the triggering of the gas generator or is pushed onto the taper after the triggering of the gas generator.

It is also advantageous if—as an alternative or in addition—the sheet-metal part has at least one hook portion, which forms a hook and, in the assembly position before the triggering of the gas generator, is hooked to a taper of the feed tube to form a positive joint with the feed tube or, after the triggering of the gas generator, is hooked to the taper to form a positive joint with the feed tube.

The fixing element is preferably annular and has at least one through hole in the region of the center of the feed tube.

With a view to a uniform holding force, it is regarded as advantageous if the fixing element is rotationally symmetrical.

The invention is explained in greater detail below by means of illustrative embodiments; in the drawing, by way of example, FIG. 1 shows an illustrative embodiment of a tensioner drive according to the invention in a three dimensional exploded view, FIG. 2 shows an illustrative embodiment of a fixing element which can be used in the tensioner drive according to FIG. 1, FIG. 3 shows the fixing element according to FIG. 2 after mounting within a feed tube of the tensioner drive according to FIG. 1, FIG. 4 shows another illustrative embodiment of a fixing element which can be used in the tensioner drive according to FIG. 1, FIG. 5 shows the fixing element according to FIG. 4 after mounting within a feed tube, which is provided with a taper, FIG. 6 shows another illustrative embodiment of a fixing element which can be used in the tensioner drive according to FIG. 1, FIG. 7 shows the fixing element according to FIG. 6 after the mounting of a helical spring, FIG. 8 shows the fixing element according to FIG. 6 with the helical spring according to FIG. 7 mounted thereon, after mounting within a feed tube provided with a taper, FIG. 9 shows another illustrative embodiment of a fixing element which can be used in the tensioner drive according to FIG. 1, wherein a helical spring is mounted on the fixing element, FIG. 10 shows the fixing element with the helical spring according to FIG. 9 mounted thereon, after mounting within a feed tube of a tensioner drive, FIG. 11 shows another illustrative embodiment of a fixing element which can be used in the tensioner drive according to FIG. 1, FIG. 12 shows the fixing element according to FIG. 11 after mounting within a feed tube of a tensioner drive, FIG. 13 shows another illustrative embodiment of a claw portion, which can be used with fixing elements, especially the fixing elements according to FIGS. 2 to 12, and FIG. 14-22 show another illustrative embodiment of a fixing element which can be used in the tensioner drive according to FIG. 1.

For the sake of clarity, the same reference signs are always used for identical or comparable components in the figures.

In FIG. 1, an illustrative embodiment of a belt retractor 10 can be seen in a schematic exploded view. Among the components of the belt retractor 10 are a belt spindle 20, a tensioner drive 30 and an inertia coupling 35 connecting the tensioner drive 30 and the belt spindle 20.

The tensioner drive 30 comprises a pyrotechnic gas generator 40, e.g. in the form of a micro gas generator, a driving wheel 50, a curved feed tube 60 connecting the gas generator 40 and the driving wheel 50, a plurality of mass or thrust bodies 70 and a thrust body in the form of a driving piston 71, which forms the first thrust body in the thrust body chain—as seen from the direction of the gas generator 40. The thrust bodies 70 are spherical, for example, do not form a seal relative to the feed tube 60 and are pushed by the driving piston 71 after the triggering of the gas generator 40. The driving piston 71 preferably seals the feed tube 60 permanently or temporarily, preferably, however, at least in the starting phase after the ignition of the gas generator 40.

The driving wheel 50 is held rotatably between a holding cap 51 and a holding plate 52 and has receiving pockets in the form of receiving cups 80, in which the thrust bodies 70 engage in order to drive the driving wheel. For this purpose, the thrust bodies 70 are coupled tangentially into the driving wheel 50 and run past the latter tangentially while engaging in the receiving cups 80, after which they enter a downstream receiving container 81.

A spring element 100 and a fixing element 200 are arranged between the gas generator 40 and the driving piston 71. The function of the spring element 100 is to hold the thrust bodies 70 and the driving piston 71 without rattling in the feed tube 60, namely in the section between the driving wheel 50 and the fixing element 200, in the mounted state, i.e. before the triggering of the gas generator 40. Here, the spring element 100 is not supported on the gas generator 40 but on the fixing element 200, which, in turn, is itself supported on the inner wall 61 of the feed tube 60 and thereby automatically maintains its position within the feed tube 60. In other words, therefore, the fixing element 200 is not supported on the gas generator 40.

FIG. 2 shows an illustrative embodiment of a fixing element 200 which can be used in the tensioner drive 30 according to FIG. 1. The fixing element 200 is formed by a stamped and bent sheet-metal part or, in other words, a bent stamping or sheet-metal stamping.

The fixing element 200 has a through hole 210, through which the gas of the gas generator 40 can pass through the fixing element 200 in the direction of the driving piston 71 lying in front thereof and in the direction of the thrust body 70 situated in front thereof.

The fixing element 200 is provided with an annular holding portion 220, on which the spring element 100 according to FIG. 1 or some other type of spring element, e.g. a resilient portion molded onto a sealing element, can be supported.

Moreover, the fixing element 200 has five claw portions 230, which are arranged in a rotationally symmetrical manner and which are formed by end portions of the sheet of the fixing element 200. The end portions or claw portions are bent radially outward and, after mounting of the fixing element 200 within the feed tube 60 according to FIG. 1, rest resiliently against the inner wall 61 of the feed tube 60, forming a nonpositive or frictional joint. In the illustrative embodiment according to FIG. 2, the nonpositive or frictional joint is based on the fact that the outer end face 231 of the sheet of the fixing element 200 rests in surface contact on the inner wall 61 of the feed tube 60. Moreover, the nonpositive or frictional joint in the illustrative embodiment according to FIG. 2 is based on the fact that one or both end edges 232 and 233 bounding the end face 231 press resiliently against the inner wall 61 of the feed tube 60. As an alternative, the outer end (or end face 231) could also be of linear (or less extensive or linear) design and rest only in a linear fashion on the inner wall 61 of the feed tube 60 or claw or cut into the inner wall 61 only in a linear fashion; a linear configuration of this kind is shown in greater detail in FIG. 13 and is explained in greater detail below.

The configuration of the claw portions 230 ensures fixing of the fixing element 200 both in the driving direction A and—and this is particularly advantageous for assembly in order to secure the position of the fixing element 200 after assembly—counter to the driving direction A:

In the driving direction A, the fixing element 200 is held by means of the end faces 231 of the claw portions 230 and by means of the end edges 232 thereof, which lie at the front or closer to the driving piston 71 situated in front thereof than the end edges 233 in driving direction A.

As seen counter to the driving direction A, the fixing element 200 is supported radially within the feed tube by means of the end faces 231 of the claw portions 230 and the end edges 233 thereof, which lie at the rear or closer to the gas generator 40 (cf FIG. 1) than the end edges 232 in driving direction A.

FIG. 3 shows the fixing element 200 according to FIG. 2 after installation within a feed tube 60, which can correspond to the feed tube 60 of the tensioner drive 30 according to FIG. 1. It can be seen that the claw portions 230 extend radially outward and the end face 231 of the sheet of the fixing element 200 presses flat against the inner wall 61 of the feed tubes 60 in the region of the claw portions 230. Moreover, it can be seen that the end edges 232 and 233 of the sheet of the fixing element 200 press against the inner wall 61 of the feed tube 60 in the region of the claw portions 230.

Arranged in front of the fixing element 200, as seen in the driving direction A of the thrust bodies 70, is a spring element 100, which is formed by one portion of a sealing ring 300, in particular a molding on the sealing ring 300. The sealing ring 300 is mounted on the driving piston 71 and, together with the driving piston 71, seals off the feed tube 60. The driving piston 71 is preferably a driving piston which automatically ceases to be leaktight after a certain period of time following the triggering of the gas generator 40 or after traveling a predetermined distance.

The assembly of the arrangement according to FIG. 3 can take place as follows, for example:

First of all, the thrust bodies 70 and the driving piston 71 provided with the sealing ring 300 are introduced into the feed tube 60. In order to avoid rattling of the thrust bodies 70 within the feed tube 60, the fixing element 200 is then introduced into the feed tube 60 in the driving direction A and is pushed in the driving direction A until the spring element 100 or the resilient portion of the sealing ring 300 has been at least slightly compressed; the spring action of the resilient portion of the sealing ring 300 holds the thrust bodies 70 and the driving piston 71 without rattling within the feed tube 60.

As soon as this rattle-free position has been reached, the fixing element 200 holds itself firmly within the feed tube 60 by virtue of the resilient or claw action of the claw portions 230. The thrust bodies 70, the driving piston 71, the sealing ring 300 and the fixing element 200 are thus held by nonpositive or frictional engagement by means of the claw portions 230 of the fixing element 200 without a contributory effect from the gas generator 40.

If the gas generator 40 is triggered, the gas of the gas generator will pass through the through hole 210 of the fixing element 200 and drive the driving piston 71 and the thrust bodies 70 lying in front thereof in the direction of the driving wheel 50. Owing to the wedging or claw action of the claw portions 230, the fixing element 200 will remain in its original assembly position or will at least lag behind the thrust bodies 70 moving toward the driving wheel 50 in the driving direction A and behind the driving piston 71, thus allowing a return movement of those thrust bodies 70 which are still in the feed tube 60 and of the driving piston 71 to take place as part of belt force limitation on completion of the tensioning process, without the fixing element 200 forming an obstruction.

FIG. 4 shows another illustrative embodiment of a fixing element 200 which can be used in the tensioner drive 30 according to FIG. 1. This fixing element 200 is also preferably a stamped and bent sheet-metal part.

The fixing element 200 has five claw portions 230, which can correspond in configuration and arrangement to the claw portions 230 of the fixing element 200 according to FIGS. 2 and 3. As regards the operation of the claw portions 230, attention is therefore drawn to the above statements in connection with FIGS. 2 and 3.

The fixing element 200 furthermore has a through hole 210 and an annular holding portion 220, on which a spring element 100 can be supported. In the illustrative embodiment according to FIG. 4, the dimensioning of the through hole 210 is slightly larger than in the illustrative embodiment according to FIG. 2, and the dimensioning of the annular holding portion 220 in the illustrative embodiment according to FIG. 4 is slightly smaller than in the illustrative embodiments according to FIG. 2; the configuration of the fixing element 200 according to FIG. 4 is particularly suitable for the use of a helical spring as a spring element.

In contrast to the illustrative embodiment according to FIG. 2, the fixing element 200 according to FIG. 4 has a supporting portion 240, which is suitable for support on a taper of a feed tube.

FIG. 5 shows the fixing element 200 according to FIG. 4 after mounting within a feed tube 60, which is designed with a taper 62 in the region of the inner wall 61. The arrangement of the taper 62 within the feed tube 60 and the number of thrust bodies 70 are preferably chosen in such a way that, after installation of the thrust bodies 70 and of the driving piston 71 within the feed tube 60, the thrust bodies 70 and the driving piston 71 can be held without rattling by means of a spring element, designed as a helical spring 110, and the fixing element 200 according to FIG. 4 once the supporting portion 240 of the fixing element 200 is or has been pushed onto the taper 62.

The assembly of the tensioner drive 30 is preferably performed as follows:

First of all, the thrust bodies 70 and the driving piston 71 are introduced into the feed tube 60. The fixing element 200 is then pushed into the feed tube 60 in the driving direction A and pressed against the supporting portion 240, thereby compressing the helical spring 110. By virtue of the spring force of the helical spring 110, the thrust bodies 70 and the driving piston 71 are held without rattling within the feed tube 60. The fixing element 200 is prevented from being pushed back counter to the driving direction A by the nonpositive or frictional joint provided by means of the claw portions 230, in particular by the end face 231 and the end edge 233; in this regard, attention is drawn to the above explanations in connection with FIGS. 2 and 3.

FIG. 6 shows another illustrative embodiment of a fixing element which can be used in the tensioner drive 30 according to FIG. 1. The fixing element 200 has a through hole 210, five claw portions 230 and a supporting portion 240, which can correspond to the corresponding portions on the fixing element 200 according to FIG. 4. As regards these portions, attention is drawn to the above statements in connection with FIGS. 2 to 5.

In the case of the fixing element 200 according to FIG. 6, in contrast to the illustrative embodiment according to FIG. 4, the annular holding portion 220, on which a helical spring 110 can be supported, is not of flat design but is offset or bent forward axially when viewed in the driving direction A, thereby resulting in an annular (or tubular) bearing surface 221 extending in the axial direction, which is suitable for pre-mounting of a spring, in particular a helical spring.

FIG. 7 shows the fixing element 200 according to FIG. 6 after a helical spring 110 has been placed on the annular holding portion 220 and a preassembled fixing element/spring unit 500 has been formed, which is suitable for the rattle-free installation of thrust bodies within a feed tube. It can be seen that the helical spring 110 is held radially by the axially extending annular bearing surface 221 of the annular holding portion 220.

FIG. 8 shows the fixing element 200 with the helical spring 110 after mounting within a feed tube 60 provided with a taper 62.

As already explained in connection with FIG. 5, the fixing element 200 is preferably mounted in such a way that, in the mounted state, the supporting portion 240 of the fixing element 200 is supported on the taper 62 of the feed tube 60 and, in the process, compresses the helical spring 110, thereby holding the thrust bodies 70 and the driving piston 71 without rattling within the feed tube 60.

FIG. 9 shows another illustrative embodiment for a fixing element 200 and a helical spring 110, which are suitable for holding thrust bodies without rattling within a feed tube. In terms of its construction, the fixing element 200 corresponds substantially to the fixing element 200 according to FIG. 2, and therefore attention is drawn to the above statements in connection with FIG. 2. Supported on the annular holding portion 200 of the fixing element 200 is a helical spring 110, which is spiral-shaped and tapers in the form of a screw.

The fixing element 200 and the helical spring 110 form a pre-assembled fixing element/spring unit 500 which is suitable for rattle-free mounting of thrust bodies within a feed tube.

FIG. 10 shows the fixing element 200 and the helical spring 110 according to FIG. 9 after mounting within a feed tube 60. It can be seen that the fixing element 200 is supported radially on the inner wall 61 of the feed tube 60 by means of its claw portions 230 and thus fixes its own position in the longitudinal direction of the feed tube 60. In the initial state or mounted state, the helical spring 110 is at least slightly compressed in order to ensure rattle-free holding of the thrust bodies 70 and of the driving piston 71.

In the illustrative embodiment according to FIG. 10, the driving piston 71 is a permanently leaktight driving piston, i.e. one which permanently maintains its sealing effect, even during the tensioning process and after completion of the tensioning process.

FIG. 11 shows another illustrative embodiment of a fixing element 200, which is preferably formed by a stamped and bent sheet-metal part. The fixing element 200 has a through hole 210, an annular holding portion 220 for supporting a spring element 100 or helical spring 110, three radially arranged claw portions 230, which can correspond in terms of their configuration to the claw portions 230 in the illustrative embodiments according to FIGS. 1 to 10, and three hook portions 250 arranged in a rotationally symmetrical manner. The hook portions 250 extend radially outward and are designed to hook firmly to a taper of a feed tube.

FIG. 12 shows the fixing element 200 after mounting within a feed tube 60, which is designed with a taper 62. It can be seen that the hook portions 250 of the fixing element 200 are designed in such a way that they can hook to the taper 62 of the feed tube 60 and can thus prevent the fixing element 200 from moving too far further in the driving direction A after triggering of the gas generator 40 (or even during mounting itself); this is because the hook portions 250 hold the fixing element 200 firmly on the taper 62.

In the illustrative embodiment according to FIG. 12, a spring element for holding the thrust bodies 70 and the driving piston 71 without rattling within the feed tube 60 is formed by a sealing ring 300, which is mounted on the driving piston 71.

FIG. 13 shows, by way of example, a particularly preferred variant embodiment of the claw portions 230; the claw portion 230 shown in FIG. 13 can be used with all the fixing elements 200 explained by way of example in connection with FIGS. 2 to 12.

It can be seen in FIG. 13 that, in the case of the claw portion 230, the outer end face 231 does not rest in surface contact, in particular does not rest in full surface contact, on the inner wall 61 of the feed tube 60 but only by means of the end edge 233 at the rear—as seen in the driving direction A. The rear end edge 233 presses resiliently against the inner wall 61 of the feed tube 60. The rear end edge 233 preferably claws or cuts in a linear fashion into the inner wall 61 or into a coating applied to the inner wall 61, e.g. into a paint coating applied to the inner wall 61, thus increasing the holding force of the claw portion 230 by positive engagement or a type of positive engagement.

In other respects, the above statements in connection with FIGS. 2 to 12 apply correspondingly to the embodiment according to FIG. 13.

FIG. 14 shows another illustrative embodiment of a fixing element 200 which can be used in the tensioner drive 30 according to FIG. 1. The fixing element 200 is preferably a stamped and bent sheet-metal part.

The fixing element 200 according to FIG. 14 has a radially outwardly curved outer edge which forms a circular-arc-shaped claw 610. The circular-arc-shaped claw 610 extends radially to the outside and can therefore rest resiliently against an inner wall of a feed tube, forming a nonpositive or frictional joint.

Moreover, FIG. 14 shows three radially inwardly curved supporting portions 620 which serve to support a spring element (not shown in FIG. 14).

FIG. 15 shows the fixing element 200 according to FIG. 14 in another view, to be precise with a view of the circular-arc-shaped claw 610.

FIG. 16 shows the fixing element 200 according to FIGS. 14 and 15 in a plan view. The radially inwardly curved supporting portions 620 and the circular-arc-shaped claw 610 which is formed by the radially outwardly curved edge of the fixing element 200 can be seen.

FIG. 17 shows the fixing element 200 in a cross section according to the sectional line XVII-XVII.

FIG. 18 shows the fixing element 200 according to FIGS. 14 to 16 in a side view.

Figure 1:
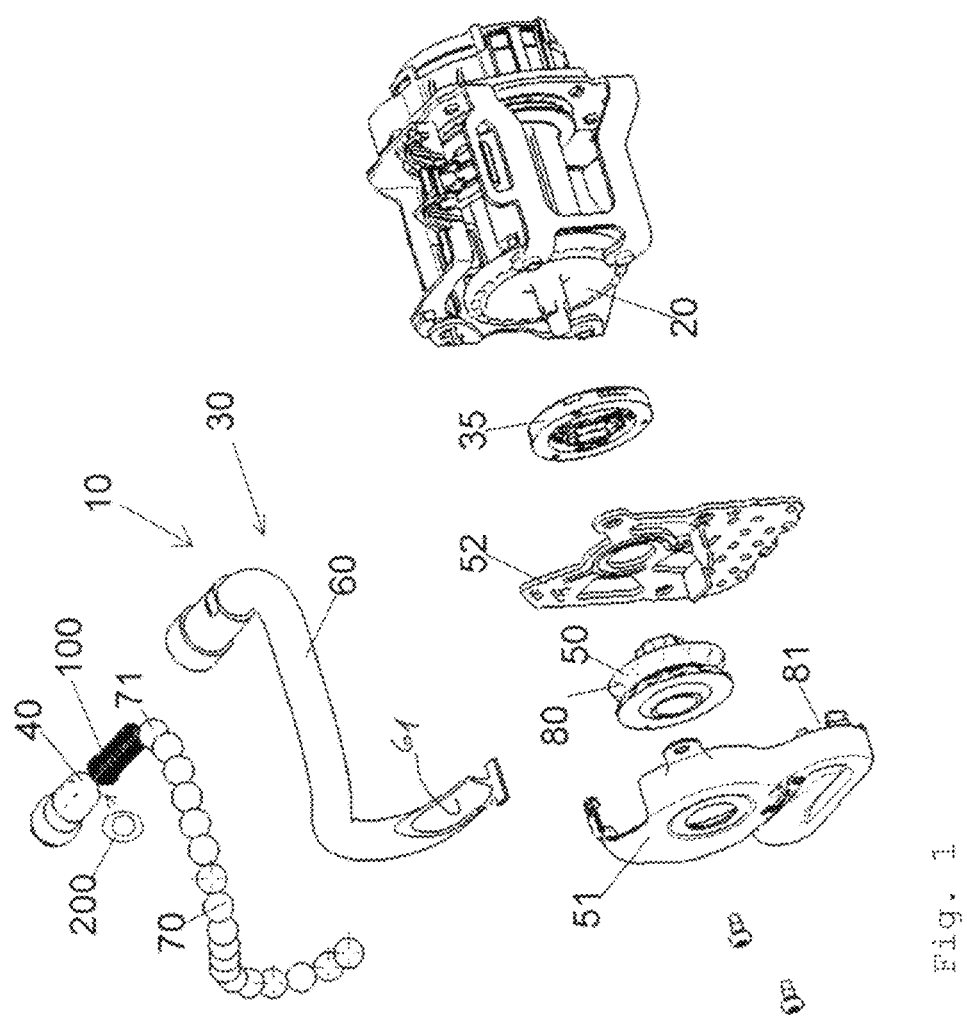

FIG. 19 shows the fixing element 200 according to FIGS. 14 to 18 and a spring element in the form of a coil spring 630, the spring end 631 of which is suitable for resting on the supporting portions 620 of the fixing element 200.

FIG. 20 shows a feed tube 60 in a sectioned state, in which feed tube 60 a gas generator 40, the fixing element 200 according to FIGS. 14 to 19, the coil spring 630 according to FIG. 19 and a driving piston 50 are arranged. It can be seen that the spring end 631 of the coil spring 630 is supported on the radially inwardly curved supporting portion 620 of the fixing element 200.

Moreover, it can be seen in FIG. 20 as a result of the detail E which is shown on a larger scale that that radially outwardly curved edge of the fixing element 200 which forms the circular-arc-shaped claw 610 rests against the inner wall 61 of the feed tube 60, forming a nonpositive or frictional joint, or engages into the inner wall 61, as a result of which supporting of the fixing element 200 on the inner wall 61 occurs.

FIGS. 21 and 22 show the components shown in figure once again in three-dimensional illustrations obliquely from the side.

LIST OF REFERENCE SIGNS

- 10 belt retractor
- 20 belt spindle
- 30 tensioner drive
- 35 inertia coupling
- 40 gas generator
- 50 driving wheel
- 51 holding cap
- 52 holding plate
- 60 feed tube
- 61 inner wall
- 62 taper
- 70 thrust body
- 71 driving piston
- 80 receiving shell
- 81 receiving container
- 100 spring element
- 110 helical spring
- 200 fixing element
- 210 through hole
- 220 holding portion
- 221 bearing surface
- 230 claw portions
- 231 outer end face
- 232 end edge
- 233 end edge
- 240 supporting portion
- 250 hook portions
- 300 sealing ring
- 500 fixing element/spring unit
- 610 circular-arc-shaped claw
- 620 supporting portion
- 630 coil spring
- 631 spring end
- A driving direction
- E detail

The invention claimed is:

1. A tensioner drive (30) for a safety belt device, comprising:
   a gas generator (40),
   a driving wheel (50), and
   a feed tube (60), which connects the gas generator (40) and the driving wheel (50), wherein
      at least one thrust body is located within the feed tube between the gas generator (40) and the driving wheel (50), the at least one thrust body being accelerated after triggering of the gas generator (40) and driving the driving wheel;
      a fixing element (200) is located between the at least one thrust body (70, 71) and the gas generator (40), the fixing element being supported on an inner wall (61) of the feed tube; and
      a spring element arranged between the fixing element and the at least one thrust body is supported on an annular holding portion of the fixing element, the spring force of the spring element pushing the at least one thrust body in the direction of the driving wheel and holding the at least one thrust body without rattling within the feed tube before the triggering of the gas generator.

2. The tensioner drive (30) as claimed in claim 1, wherein, as seen in the longitudinal direction of the feed tube, frictional or positive engagement is used to ensure that, after the triggering of the gas generator (40), the fixing element (200) remains in the assembly position specified before the triggering of the gas generator (40) or at least lags behind the at least one thrust body (70, 71) situated immediately in front and driven by the gas generator (40).

3. The tensioner drive (30) as claimed in claim 1, wherein the fixing element (200) has at least one claw, which extends radially outward and rests resiliently against the inner wall (61) of the feed tube (60), forming a nonpositive or frictional joint.

4. The tensioner drive (30) as claimed in claim 1, wherein the fixing element (200) has at least one supporting portion (240), which is supported on a taper (62) of the feed tube (60) in the assembly position before the triggering of the gas generator (40) or is pushed onto the taper (62) after the triggering of the gas generator (40).

5. The tensioner drive (30) as claimed in claim 1, wherein the fixing element (200) has at least one hook, which, in the assembly position before the triggering of the gas generator (40), is hooked to a taper (62) of the feed tube (60) to form a positive joint with the feed tube (60) or, after the triggering of the gas generator (40), is hooked to the taper (62) to form a positive joint with the feed tube (60).

6. The tensioner drive (30) as claimed in claim 1, wherein the fixing element (200) is formed by a bent sheet-metal part.

7. The tensioner drive (30) as claimed in claim 6, wherein the sheet-metal part rests resiliently against the inner wall (61) of the feed tube (60) by means of an end face (231) of the sheet to form a nonpositive or frictional joint.

8. The tensioner drive (30) as claimed in claim 6, wherein an end edge (232, 233) of an end face (231) of the sheet presses resiliently against the inner wall (61) of the feed tube (60) to form a nonpositive or frictional joint.

9. The tensioner drive (30) as claimed in claim 6, wherein the sheet-metal part has a claw portion (230), which forms a claw, and extends radially outward and rests resiliently against the inner wall (61) of the feed tube (60) to form a nonpositive or frictional joint.

10. The tensioner drive (30) as claimed in claim 9, wherein
    the claw portion (230) is formed by an end portion of the sheet of the sheet-metal part; and
    an end face (231) of the sheet in the region of the claw portion (230) rests resiliently against the inner wall (61) of the feed tube (60) to form a nonpositive or frictional joint, and/or an end edge (232, 233) of the end face (231) of the sheet in the region of the claw portion (230) presses resiliently against the inner wall (61) of the feed tube (60) to form a nonpositive or frictional joint.

11. The tensioner drive (30) as claimed in one of claim 6, wherein the sheet-metal part has at least one supporting portion (240), which is supported on a taper (62) of the feed tube (60) in the assembly position before the triggering of the gas generator (40) or is pushed onto the taper (62) after the triggering of the gas generator.

12. The tensioner drive (30) as claimed in claim 6, wherein the fixing element (200) is annular and has a through hole (210) in the region of the center of the feed tube (60).

13. The tensioner drive (30) as claimed in claim 6, wherein the fixing element (200) is rotationally symmetrical.

14. The tensioner drive as claimed in one of claim 6, wherein the sheet-metal part has at least one hook portion, which forms a hook and, in the assembly position before the triggering of the gas generator, is hooked to a taper of the feed tube to form a positive joint with the feed tube or, after the triggering of the gas generator, is hooked to the taper to form a positive joint with the feed tube.

15. The tensioner drive (30) as claimed in claim 1, wherein
at least two thrust bodies are located in the feed tube; and
the fixing element (200) is arranged between the gas generator (40) and a first thrust body of the at least two thrust bodies which is the first when viewed in the driving direction (A), with a spacing relative to the gas generator (40) in the assembly position before the triggering of the gas generator.

16. The tensioner drive (30) as claimed in claim 1, wherein the claw is circular-arc-shaped and is formed by a radially outwardly curved outer edge of the fixing element.

17. The tensioner drive (30) as claimed in claim 16, wherein the circular-arc-shaped claw extends radially to the outside and rests resiliently against an inner wall of the feed tube, forming a nonpositive or frictional joint.

18. A tensioner drive for a safety belt device, comprising:
a gas generator,
a driving wheel, and
a feed tube, which connects the gas generator and the driving wheel, wherein
at least one thrust body is located within the feed tube between the gas generator and the driving wheel, the at least one thrust body being accelerated after triggering of the gas generator and driving the driving wheel;
a fixing element is located between the at least one thrust body and the gas generator, the fixing element being supported on an inner wall of the feed tube and being formed by a bent sheet-metal part; and
an end edge of an end face of the sheet presses resiliently against the inner wall of the feed tube to form a nonpositive or frictional joint.

19. A tensioner drive for a safety belt device, comprising:
a gas generator,
a driving wheel, and
a feed tube, which connects the gas generator and the driving wheel, wherein
at least one thrust body is located within the feed tube between the gas generator and the driving wheel, the at least one thrust body being accelerated after triggering of the gas generator and driving the driving wheel;
a fixing element is located between the at least one thrust body and the gas generator, wherein the fixing element is supported on an inner wall of the feed tube, is formed by a bent sheet-metal part, and is annular and has a through hole in the region of the center of the feed tube.

* * * * *